US009686815B2

(12) United States Patent
Hu et al.

(10) Patent No.: US 9,686,815 B2
(45) Date of Patent: Jun. 20, 2017

(54) DEVICES AND METHODS FOR MANAGING DISCONTINUOUS TRANSMISSION AT A WIRELESS ACCESS TERMINAL

(71) Applicant: QUALCOMM Incorporated, San Diego, CA (US)

(72) Inventors: Jun Hu, San Diego, CA (US); Rashid Ahmed Akbar Attar, San Diego, CA (US); Troy R. Curtiss, Erie, CO (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 13/831,600

(22) Filed: Mar. 15, 2013

(65) Prior Publication Data

US 2013/0201893 A1    Aug. 8, 2013

Related U.S. Application Data

(63) Continuation-in-part of application No. 13/663,061, filed on Oct. 29, 2012, now Pat. No. 8,774,074.

(Continued)

(51) Int. Cl.
*H04W 76/04* (2009.01)
*H04W 52/02* (2009.01)
(Continued)

(52) U.S. Cl.
CPC ..... *H04W 76/048* (2013.01); *H04W 52/0216* (2013.01); *H04W 52/146* (2013.01); *H04W 52/44* (2013.01); *Y02B 60/50* (2013.01)

(58) Field of Classification Search
CPC ............. H04W 52/0216; H04W 52/04; H04W 52/146; H04W 52/241; H04W 52/242;
(Continued)

(56) References Cited

U.S. PATENT DOCUMENTS 5,737,695 A    4/1998 Lagerqvist et al.
6,400,750 B1 *  6/2002 Lee et al. ..................... 375/130
(Continued)

FOREIGN PATENT DOCUMENTS

CN    1808918 A    7/2006
CN    102843208 A    12/2012
(Continued)

OTHER PUBLICATIONS

3rd Generation Partnership Project 2, Upper Layer (Layer 3) Signaling Standard for cdma2000 Spread Spectrum Systems, Sep. 2009, Version 1, Revision E.*

(Continued)

*Primary Examiner* — Michael Thier
*Assistant Examiner* — Eric Nowlin
(74) *Attorney, Agent, or Firm* — Larry J. Moskowitz

(57) ABSTRACT

Access terminals are adapted to facilitate discontinuous transmission (DTX). According to one example, an access terminal determines to disable DTX, such that a continuous reverse link transmission may occur, in a fashion such as not to interfere with the operation of a Frame Early Termination operation utilized in CDMA 1x technology. As one example, the access terminal may cease the utilization of DTX in accordance with a performance metric of a wireless communication network. The performance metric may be a forward link power control setpoint of a base station, a number of quasi-orthogonal function sets being utilized at the base station, a number of frame erasures corresponding to a forward link transmission from the base station, or any other suitable measurable parameter of the network performance. Other aspects, embodiments, and features are also claimed and described.

8 Claims, 6 Drawing Sheets

Related U.S. Application Data

(60) Provisional application No. 61/554,888, filed on Nov. 2, 2011, provisional application No. 61/712,768, filed on Oct. 11, 2012.

(51) Int. Cl.
*H04W 52/14* (2009.01)
*H04W 52/44* (2009.01)

(58) Field of Classification Search
CPC ............... H04W 52/44; H04W 72/042; H04W 76/0406; H04W 76/048; H04W 16/14; H04W 52/34; H04W 52/58; H04W 72/0406; Y02B 60/50; Y02B 60/1282
See application file for complete search history.

(56) References Cited

U.S. PATENT DOCUMENTS

| | | | |
|---|---|---|---|
| 6,590,874 B1 | 7/2003 | Wang et al. | |
| 6,747,958 B2 | 6/2004 | Vayanos et al. | |
| 6,747,963 B1* | 6/2004 | Park ..................... | H04B 1/707 370/335 |
| 6,785,250 B2 | 8/2004 | Vayanos et al. | |
| 6,917,607 B1* | 7/2005 | Yeom ..................... | H04W 28/22 370/335 |
| 6,922,389 B1* | 7/2005 | Lundby ................. | H04W 52/06 370/209 |
| 7,006,828 B1 | 2/2006 | Czaja et al. | |
| 7,146,142 B1 | 12/2006 | Raaf | |
| 7,573,853 B2* | 8/2009 | Saifuddin .............. | H04W 52/08 370/335 |
| 7,936,741 B2 | 5/2011 | Vimpari et al. | |
| 8,094,554 B2 | 1/2012 | Gholmieh et al. | |
| 8,102,872 B2 | 1/2012 | Spindola et al. | |
| 8,284,652 B2 | 10/2012 | Jou et al. | |
| 8,305,945 B2* | 11/2012 | Kim et al. ..................... | 370/311 |
| 8,411,618 B2 | 4/2013 | Kim et al. | |
| 9,408,165 B2* | 8/2016 | Jou ....................... | H04L 1/0025 |
| 2003/0078067 A1* | 4/2003 | Kim ..................... | H04W 52/146 455/522 |
| 2004/0081097 A1* | 4/2004 | Dominique et al. .......... | 370/232 |
| 2005/0096076 A1* | 5/2005 | Gu ....................... | H04W 52/54 455/522 |
| 2005/0143113 A1* | 6/2005 | Lee ....................... | H04W 52/60 455/522 |
| 2005/0208959 A1* | 9/2005 | Chen ....................... | H04W 4/06 455/515 |
| 2006/0221707 A1* | 10/2006 | Leonard .................... | 365/185.29 |
| 2006/0246936 A1* | 11/2006 | Gross et al. ................... | 455/522 |
| 2007/0037523 A1* | 2/2007 | Bi ........................ | H04B 1/1027 455/69 |
| 2007/0259682 A1* | 11/2007 | Kaikkonen ........... | H04W 52/44 455/522 |
| 2007/0286155 A1* | 12/2007 | Kaikkonen ......... | H04W 52/221 370/350 |
| 2008/0132230 A1* | 6/2008 | Marinier ............... | H04W 48/08 455/434 |
| 2008/0153429 A1 | 6/2008 | Johnson et al. | |
| 2008/0175204 A1 | 7/2008 | Jen | |
| 2009/0135754 A1 | 5/2009 | Yavuz et al. | |
| 2009/0303968 A1* | 12/2009 | Jou et al. ....................... | 370/336 |
| 2010/0093288 A1* | 4/2010 | Pan ..................... | H04W 52/0209 455/68 |
| 2010/0202501 A1* | 8/2010 | Yang ..................... | H04W 52/08 375/219 |
| 2010/0323683 A1* | 12/2010 | Kazmi et al. ............... | 455/422.1 |
| 2013/0107780 A1 | 5/2013 | Choi et al. | |
| 2013/0215812 A1 | 8/2013 | Hu et al. | |

FOREIGN PATENT DOCUMENTS

| | | | | |
|---|---|---|---|---|
| EP | 2328285 A2 | 6/2011 | | |
| KR | WO 0074292 A1 * | 12/2000 | ............ | H04W 28/22 |
| WO | WO-03007647 A1 | 1/2003 | | |
| WO | 03043221 A1 | 5/2003 | | |
| WO | WO-2006084003 A2 | 8/2006 | | |
| WO | 2006115623 A2 | 11/2006 | | |
| WO | WO-2008052201 | 5/2008 | | |
| WO | 2008076583 A1 | 6/2008 | | |
| WO | 2009152138 A2 | 12/2009 | | |
| WO | WO-2010027197 A2 | 3/2010 | | |
| WO | 2011103924 A1 | 9/2011 | | |

OTHER PUBLICATIONS

International Search Report and Written Opinion—PCT/US2012/063064—ISA/EPO—Feb. 13, 2013.

International Search Report and Written Opinion—PCT/US2013/067294—ISA/EPO—Mar. 12, 2014.

Qualcomm Europe: "TP for Signaling in support of DTX/DRX", 3GPP Draft; R1-061499, 3rd Generation Partnership Project (3GPP), Mobile Competence Centre ; 650, Route Des Lucioles; F-06921 Sophia-Antipolis Cedex; France, vol. RAN WG1, No. Shanghai, China; May 2, 2006, May 2, 2006 (May 2, 2006), XP050102348.

\* cited by examiner

DEVICES AND METHODS FOR MANAGING DISCONTINUOUS TRANSMISSION AT A WIRELESS ACCESS TERMINAL

PRIORITY CLAIM

This application is a continuation in part of U.S. application Ser. No. 13/663,061, filed 29 Oct. 2012, which claims priority to and the benefit of U.S. Non-Provisional Application Nos. 61/554,888, filed 2 Nov. 2011, and 61/712,768, filed 11 Oct. 2012. All of said applications are hereby expressly incorporated by reference as if fully set forth below in their entireties and for all applicable purposes.

TECHNICAL FIELD

The technology discussed below relates generally to wireless communications, and more specifically, to methods and devices for facilitating discontinuous transmission (DTX) for access terminals operating in a wireless communications system.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of devices are adapted to utilize such wireless communications systems. Such devices may be generally referred to as access terminals. Access terminals adapted to access one or more wireless communications systems are becoming increasingly popular, with consumers often using power-intensive applications that run on the access terminals. Access terminals are typically powered by a limited power source (e.g., rechargeable battery) and, consequently, may operate in various modes to assist in extending the operating life of the access terminal between charges. For a given battery capacity, the rate and amount of power consumption determines how much the access terminal can operate without recharging. Another way of looking at power consumption is that for a given amount of operating time between battery recharges, average power consumption dictates the required battery capacity and, consequently, the size, weight, and cost of the battery. Reducing power consumption of an access terminal can result in lower battery requirements and can save costs. Features which may assist in extending access terminal operations are desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication operable at an access terminal configured for operation in a wireless communication network. Here, the method includes the steps of transmitting a reverse link traffic channel utilizing a predetermined gating pattern, and determining, in accordance with a performance metric of the wireless communication network, to cease the utilizing of the predetermined gating pattern.

Another aspect of the disclosure provides a method of wireless communication, including the steps of transmitting a reverse link traffic channel utilizing a predetermined gating pattern, determining that the predetermined gating pattern overlaps with an ACKMask pattern utilized for frame early termination, and changing the gating pattern to enable transmission of the reverse link traffic channel during at least one PCG that does not overlap with the ACKMask pattern.

Another aspect of the disclosure provides an access terminal configured for operation in a wireless communication network, including means for transmitting a reverse link traffic channel utilizing a predetermined gating pattern, and means for determining, in accordance with a performance metric of the wireless communication network, to cease the utilizing of the predetermined gating pattern.

Another aspect of the disclosure provides an access terminal configured for operation in a wireless communication network, including means for transmitting a reverse link traffic channel utilizing a predetermined gating pattern, means for determining that the predetermined gating pattern overlaps with an ACKMask pattern utilized for frame early termination, and means for changing the gating pattern to enable transmission of the reverse link traffic channel during at least one PCG that does not overlap with the ACKMask pattern.

Another aspect of the disclosure provides an access terminal configured for operation in a wireless communication network, including at least one processor, a memory communicatively coupled to the at least one processor, and a communications interface communicatively coupled to the at least one processor, wherein the at least one processor is configured to transmit a reverse link traffic channel utilizing a predetermined gating pattern, and to determine, in accordance with a performance metric of the wireless communication network, to cease the utilizing of the predetermined gating pattern.

Another aspect of the disclosure provides an access terminal configured for operation in a wireless communication network, including at least one processor, a memory communicatively coupled to the at least one processor, and a communications interface communicatively coupled to the at least one processor, wherein the at least one processor is configured to transmit a reverse link traffic channel utilizing a predetermined gating pattern, to determine that the predetermined gating pattern overlaps with an ACKMask pattern utilized for frame early termination, and change the gating pattern to enable transmission of the reverse link traffic channel during at least one PCG that does not overlap with the ACKMask pattern.

Another aspect of the disclosure provides a computer-readable storage medium operable in an access terminal configured for operation in a wireless communication network, including instructions for causing a computer to transmit a reverse link traffic channel utilizing a predetermined gating pattern, and instructions for causing a computer to determine, in accordance with a performance metric of the wireless communication network, to cease the utilizing of the predetermined gating pattern.

Another aspect of the disclosure provides a computer-readable storage medium operable in an access terminal configured for operation in a wireless communication network, including instructions for causing a computer to transmit a reverse link traffic channel utilizing a predetermined gating pattern, instructions for causing a computer to determine that the predetermined gating pattern overlaps with an ACKMask pattern utilized for frame early termination, and instructions for causing a computer to change the gating pattern to enable transmission of the reverse link traffic channel during at least one PCG that does not overlap with the ACKMask pattern.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for CDMA 1× protocols and systems, and related terminology may be found in much of the following description. However, those of ordinary skill in the art will recognize that one or more aspects of the present disclosure may be employed and included in one or more other wireless communication protocols and systems.

Figure 1:
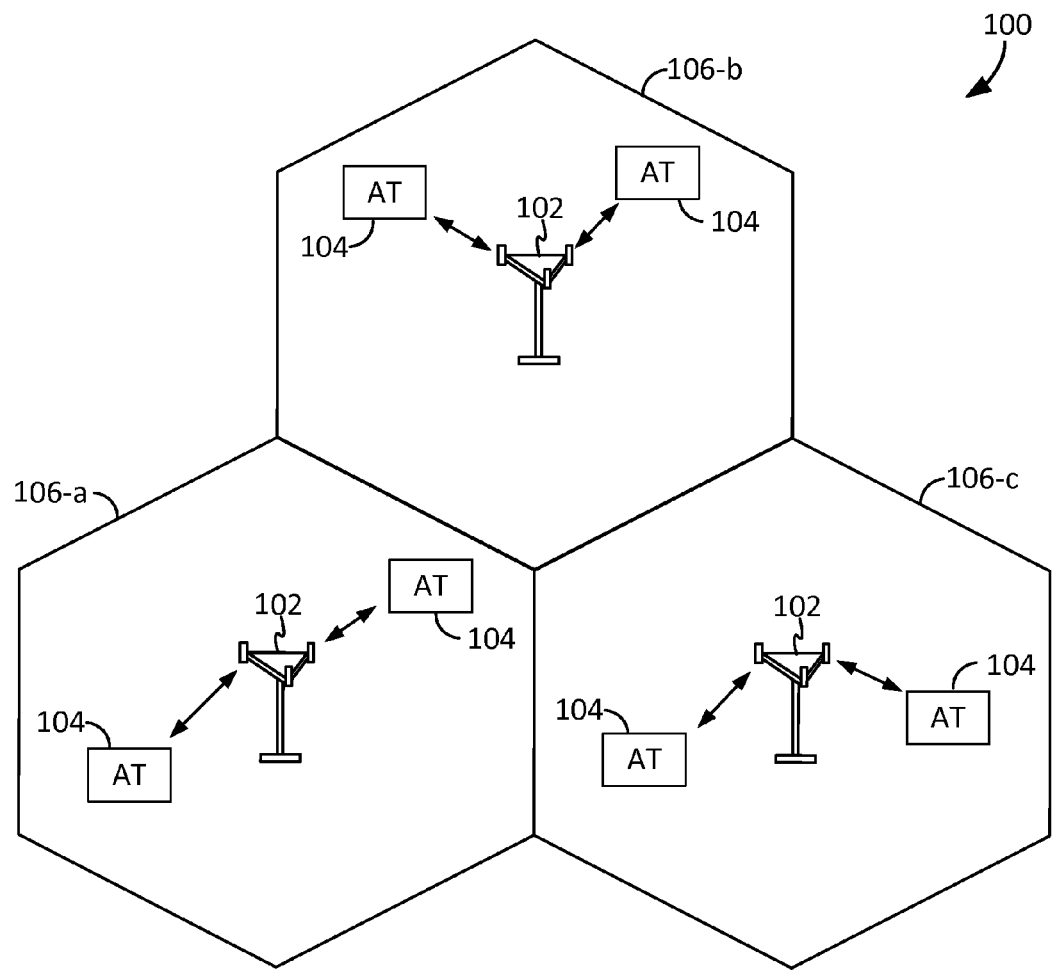
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
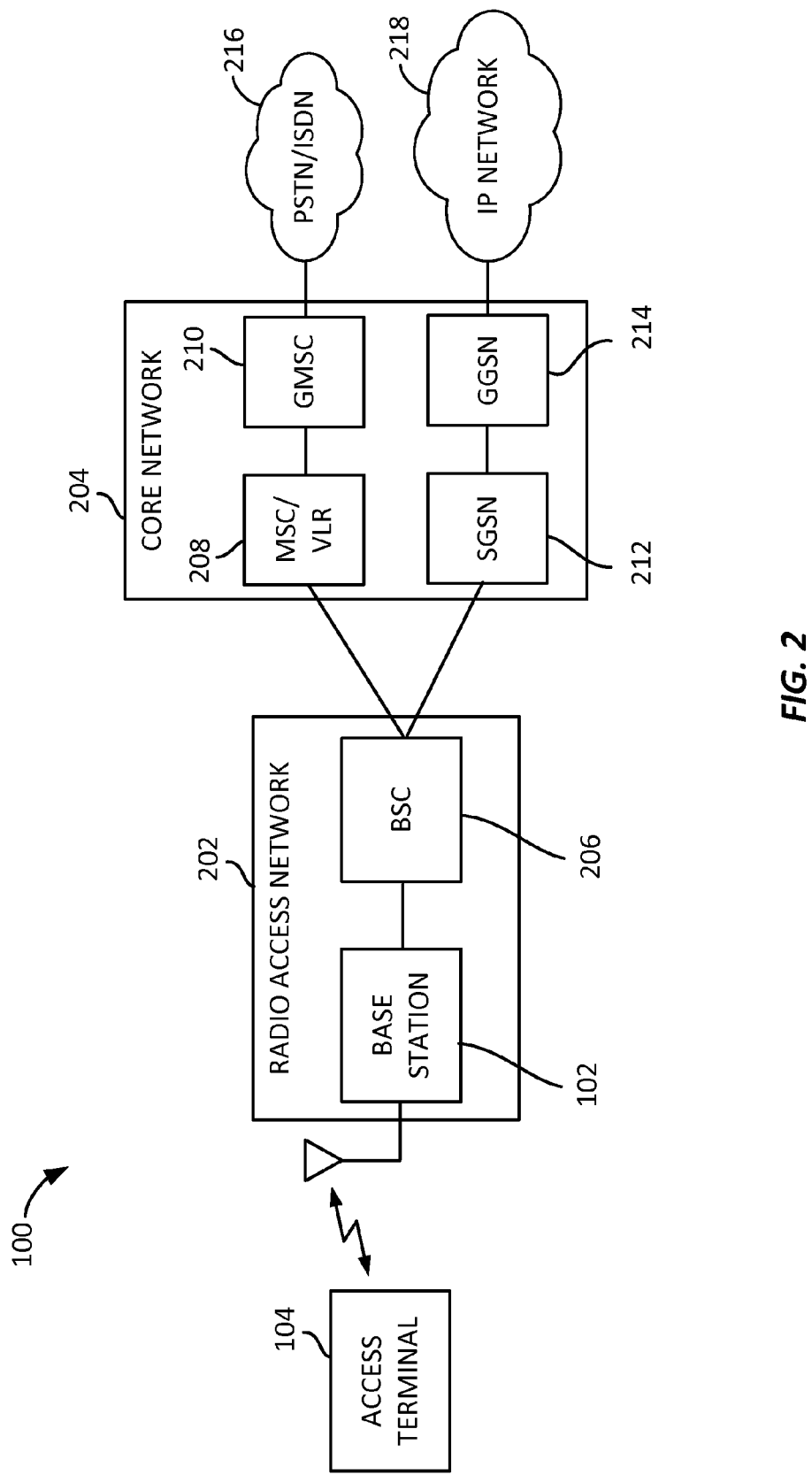
FIG. 2 is a block diagram illustrating select components of the wireless communication system of FIG. 1 according to some embodiments.

The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or an AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

The wireless communications system 100 may employ data-optimized architecture and/or protocols, such as a 1×EV-DO network. As an access terminal 104 operates within such a system 100, the access terminal 104 may employ various modes of operation, including a traffic mode (or traffic state) and a dormant mode (or dormant state). In traffic mode, the wireless communications system 100 allocates air link resources for communication between the access terminal 104 and the base station 102. In dormant mode, the traffic channel is torn down, and air link resources are powered OFF at the access terminal 104. Power required to operate these resources is consequently conserved during the dormant mode, thus extending battery life at the access terminal 104. Other subsystems of the access terminal 104 may also be powered OFF or put into a "power save" mode for most of the time during the dormant mode. The access terminal 104 may occasionally "wake up" to monitor control channels, such as a paging channel (PCH) for paging messages. Such paging messages may include messages that alert the access terminal 104 to the occurrence of an incoming voice or data call and control/overhead messages that carry system information and other information for the access terminal 104.

An access terminal 104 may transition from a dormant state to traffic state in response to a voice call or data communication. The voice call or the data communication may be incoming (to the access terminal 104) or outgoing (from the access terminal 104). Conversely, the access terminal 104 may transition from the traffic state to the dormant state when traffic activity ceases for some predetermined period of time. Typically, the radio network controls the transitions between the two states.

As an access terminal 104 operates within the wireless communications system 100, traffic activity may be quite asymmetrical between the base station 102 and the access terminal 104. In other words, considerably more traffic may be communicated in one direction than in the opposite direction. This is particularly so for data communication, when downlink traffic flow typically exceeds uplink traffic flow by a large margin. For example, a user at an access terminal 104 may be downloading a large file for a relatively long period of time, with mostly control information being communicated on the uplink. The control information may be from various layers, for example, Internet Protocol (IP) acknowledgements, and power control, rate control, and pilot of the physical air link. Another example of asymmetrical traffic is internet browsing where a gap occurs between user clicks and gaps between objects downloaded in one page originating from a single web page click. Similarly, internet audio/radio and video streaming encounter periods of inactivity while data is downloading. During such time periods, uplink resources of the access terminal 104 typically remain powered ON and consequently consuming power, although they are not needed to transmit user (payload) data from the access terminal 104 to the base station 102.

Because of the importance of long battery life in mobile devices such as the access terminal 104, in addition to extensive effort in improving hardware to utilize lower power, many algorithms and techniques have been developed to reduce power consumption. For example, a Smart Blanking algorithm has been utilized to reduce power consumption when there is no data to send, such as during a period of silence in voice communication. Furthermore, during active data transmission, when power consumption is even more significant, a discontinuous transmission (DTX) mode has been utilized to reduce the duration of time that the reverse link transmitter is powered on. That is, the access terminal 104 may gate off both data and pilot, meaning that these signals are only transmitted part of the time (e.g., half of the time), while still enabling the receiver (i.e., the base station 102) to reliably decode the data. Here, when gated on, power consumption at the access terminal 104 is relatively high, being based on the transmit power; but while gated off, power consumption is relatively low, since the power amplifier is turned off. Here, because the current consumption is not a linear function of the reverse link transmission power, but instead is relatively flat for most of transmit power levels, a reduction of the on-time of the transmit chain, as may be achieved by enabling DTX, provides significant power consumption reduction.

In some conventional access terminals, DTX is controlled by the wireless communications system 100, such that the system 100 indicates to the access terminal whether or not to employ DTX. In some instances, however, it is beneficial to both power consumption and network interference to enable an access terminal to employ DTX independently from the wireless communications system 100. Here, such an operation may be referred to as device-only DTX. With device-only DTX, the access terminal 104 autonomously gates its reverse link transmissions without communicating with the base station 102 or other network nodes to coordinate timing or other aspects of the gating. Rather, by taking advantage of the redundancy and robust coding in the reverse link transmissions, these transmissions may be turned off as much as possible, e.g., up to the level allowable in terms of decoding performance at the receiver, in order to reduce power consumption.

Meanwhile, at the base station 102, with the increased usage of mobile devices, issues of base station capacity can arise. In particular, as the number of access terminals served by the base station rises, capacity can be limited by issues of interference and bandwidth. One exemplary technique implemented in 1x-Advanced technology for improving capacity at a base station 102 is called "Frame Early Termination." Here, when the base station 102 transmits a frame on the forward link, if the SNR is sufficiently high, it may be possible for the access terminal 104 to decode the frame earlier than the end of the frame. Thus, once the access terminal 104 successfully decodes the frame, it can transmit an acknowledgment (ACK) message indicating that the frame has been successfully received, and telling the base station 102 to terminate transmission of the frame earlier than the nominal length of the frame. In this way, the resources used by the base station 102 can be conserved, since forward link transmissions may be less lengthy. Moreover, interference that would otherwise be caused by the continued forward link transmission can be mitigated by its early termination.

The timing for the transmission of these ACK messages by the access terminal 104 corresponds to a certain "mask," called an ACKMask. In particular, the ACKMask identifies the set of PCGs during which the access terminal 104 is to transmit an ACK message for Frame Early Termination. Here, the base station 102 generally transmits information about the ACKMask to the access terminal 104.

While these DTX and Frame Early Termination procedures can each enhance characteristics of the wireless communication system, it is possible that, when they are utilized together at the same time, the DTX timing, where the access terminal's transmitter is turned off, may coincide with the timing where the access terminal 104 is scheduled to transmit the ACK message for Frame Early Termination. In this case, the access terminal 104 may fail to transmit the ACK message, even though the access terminal 104 properly received the frame and intended to request early termination of the transmission of the frame.

Therefore, one or more aspects of the present disclosure provide for the disablement of a DTX operation in a suitable fashion as not to interfere with the proper operation of the Frame Early Termination operation. More specifically, the access terminal 104 may determine to disable the gating of the reverse link transmissions corresponding to the DTX operation, in accordance with one or more network parameters. Here, a network parameter may correspond to any of various measurable (by the access terminal) parameters corresponding to the base station 102 or other suitable node in the access network, including but not limited to noise in forward link transmissions, performance metrics of the forward link transmissions, etc.

Figure 3:
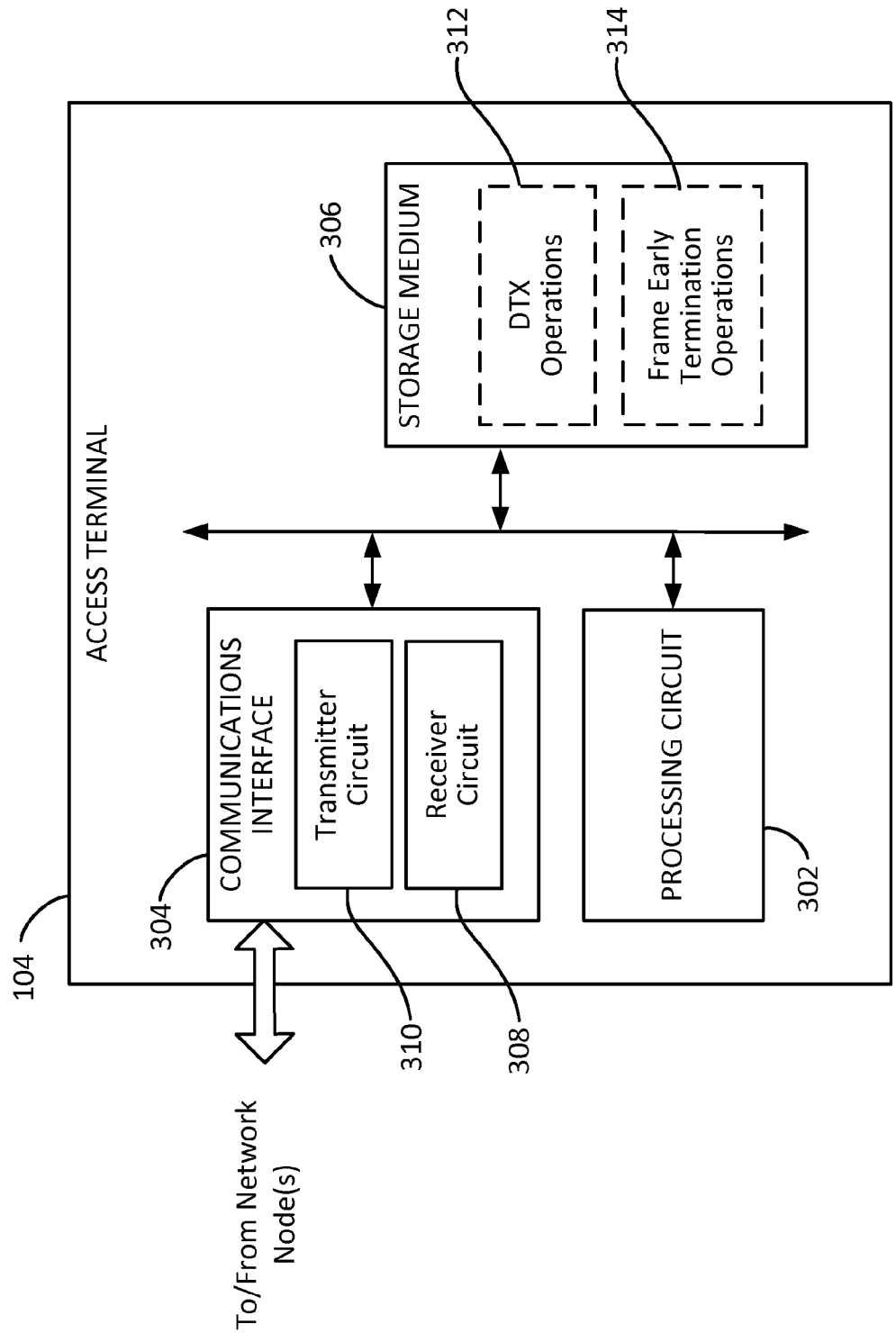
FIG. 3 is a block diagram illustrating select components of an access terminal according to some embodiments.

Turning to FIG. 3, a block diagram is shown illustrating select components of an access terminal 104 according to at least one example of the present disclosure. The access terminal 104 includes a processing circuit 302 coupled to or placed in electrical communication with a communications interface 304 and a storage medium 306.

The processing circuit 302 is arranged to obtain, process and/or send data, control data access and storage, issue commands, and control other desired operations. The processing circuit 302 may include circuitry adapted to implement desired programming provided by appropriate media in at least one example. For example, the processing circuit 302 may be implemented as one or more processors, one or more controllers, and/or other structure configured to execute executable programming. Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 302 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 302 are for illustration and other suitable configurations within the scope of the present disclosure are also contemplated.

The processing circuit 302 is adapted for processing, including the execution of programming, which may be stored on the storage medium 306. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 304 is configured to facilitate wireless communications of the access terminal 104. For example, the communications interface 304 may include circuitry and/or programming adapted to facilitate the communication of information bi-directionally with respect to one or more wireless network devices (e.g., network nodes). The communications interface 304 may be coupled to one or more antennas (not shown), and includes wireless transceiver circuitry, including at least one receiver circuit 308 (e.g., one or more receiver chains) and/or at least one transmitter circuit 310 (e.g., one or more transmitter chains). By way of example and not limitation, the transmitter circuit 310 may include a power amplifier, filter banks and other transmitter chain components.

The storage medium 306 may represent one or more computer-readable, machine-readable, and/or processor-readable devices for storing programming, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor, including portable or fixed storage devices, optical storage devices, and various other mediums capable of storing, containing and/or carrying programming. By way of example and not limitation, the storage medium 306 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the access terminal 104, external to the access terminal 104, distributed across multiple entities).

Programming stored by the storage medium 306, when executed by the processing circuit 302, causes the processing circuit 302 to perform one or more of the various functions and/or process steps described herein. For example, the storage medium 306 may include discontinuous transmission (DTX) operations 312. The DTX operations 312 are adapted to cause the processing circuit 302 to employ and manage the enablement and disablement of DTX operations, and in some examples, to control the gating pattern utilized for the DTX operations, as described herein. Further, the storage medium 306 may include Frame Early Termination operations 314. The Frame Early Termination operations 314 are adapted to cause the processing circuit 302 to employ and manage operations such as a determination that a frame is properly decoded, and scheduling and transmission of an acknowledgment (ACK) in accordance with a suitable ACKMask.

Thus, according to one or more aspects of the present disclosure, the processing circuit 302 is adapted to perform (in conjunction with the storage medium 306) any or all of the processes, functions, steps and/or routines for any or all of the access terminals described herein (e.g., access terminal 104, access terminal 104). As used herein, the term "adapted" in relation to the processing circuit 302 may refer to the processing circuit 302 being one or more of configured, employed, implemented, and/or programmed (in conjunction with the storage medium 306) to perform a particular process, function, step and/or routine according to various features described herein.

Figure 4:
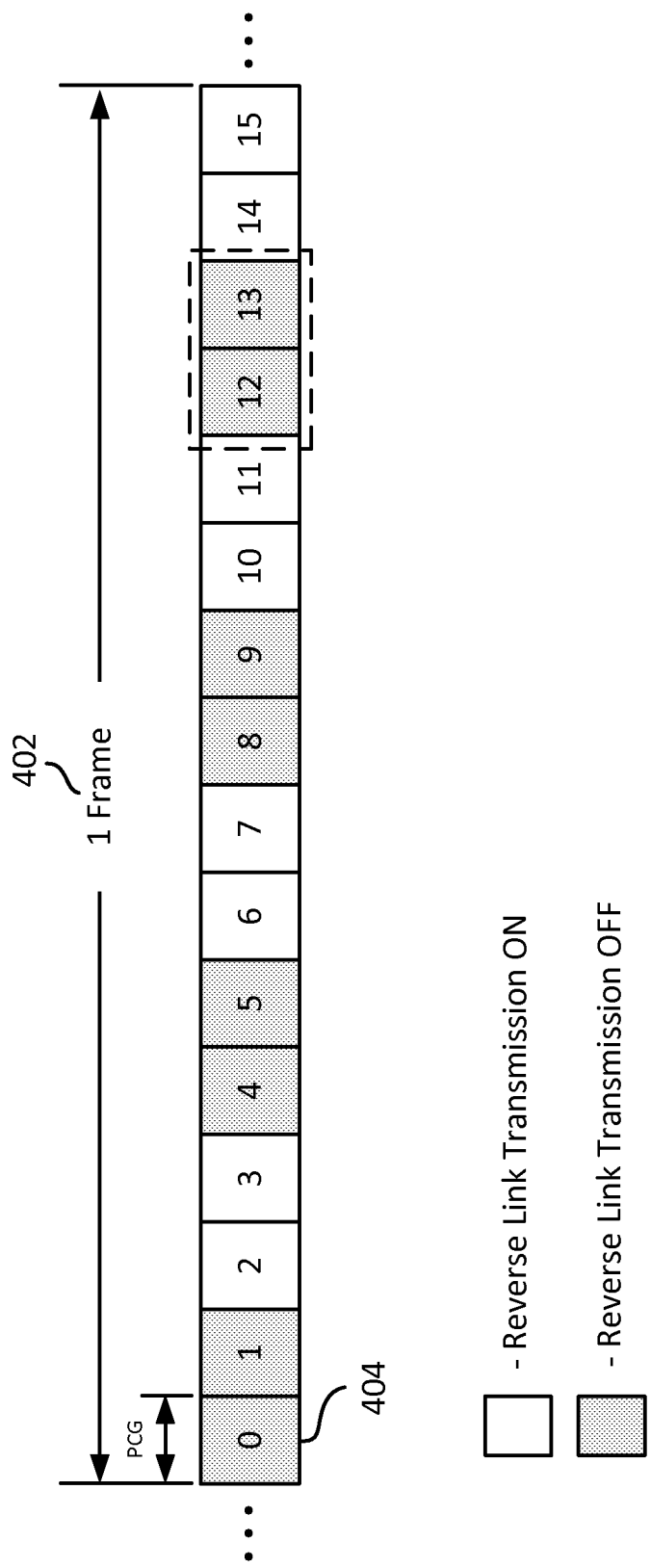
FIG. 4 is a block diagram of two uplink subframes illustrating an example of a DTX mode according to some embodiments.

FIG. 4 is a block diagram illustrating an uplink frame as one example of a 1×DTX mode according to some aspects of the disclosure. Generally speaking, 1× employs frames that are each 20 milliseconds long. Each 1× frame is divided into sixteen equal periods called slots, timeslots, or power control groups (PCGs). As shown in FIG. 4, a frame 402 includes sixteen PCGs 404, numbered 0 through 15.

When a DTX mode is enabled by the access terminal 104, communication between the access terminal 104 and one or more network entities (e.g., a base station 102) can be carried out as shown in the example depicted in FIG. 4. As illustrated, the access terminal 104 is adapted to carry out communication according to an alternating ON and OFF pattern (e.g., an arrangement with two on-PCGs, followed by two off-PCGs). In this example, the access terminal 104 can power ON the transmitter circuit 304 for two PCGs and then power OFF one or more components of the transmitter circuit 304 for two PCGs. In the specific example illustrated in FIG. 4, the transmitter circuit 304 can be powered ON for reverse link transmission during PCGs 2, 3, 6, 7, 10, 11, 14, and 15 of the frame, and at least a portion of the transmitter circuit 304 can be powered OFF for reverse link transmissions during PCGs 0, 1, 4, 5, 8, 9, 12, and 13. This sequence may in some examples be repeated during each frame. Although the example in FIG. 4 illustrates one possible gating pattern for the DTX mode, it will be apparent that other variations are also possible including variations in the durations of ON and OFF periods and/or the particular locations of ON and OFF periods within each frame.

As described above, one or more aspects of the disclosure provide for the disablement of the DTX operation in accordance with one or more network parameters, in a suitable fashion as not to interfere with the proper operation of the Frame Early Termination operation. Herein below, some examples of operations at the access terminal 104 are described, in connection with some network parameters, as particular implementation examples within the scope of the disclosure.

In one aspect of the disclosure, the parameter utilized by the access terminal 104 to determine whether to disable DTX may correspond to a forward link power control setpoint. Specifically, DTX may be disabled if the forward link power control setpoint is within a given amount of a predetermined maximum setpoint. In another aspect of the disclosure, the disablement of DTX may correspond to the number of channelization codes that the access terminal 104 detects are being utilized by the base station 102. That is, DTX may be disabled if greater than a certain number of channelization codes are being utilized, indicating that the base station 102 is in communication with a correspondingly large number of access terminals. In yet another aspect of the disclosure, disablement of DTX may correspond the number of frame erasures that occur on forward link transmissions. That is, DTX may be disabled if the access terminal 104 determines that greater than a certain number of frame erasures occur. Each of these three parameters is discussed in further detail below in relation to FIG. 5, in turn.

Figure 5:
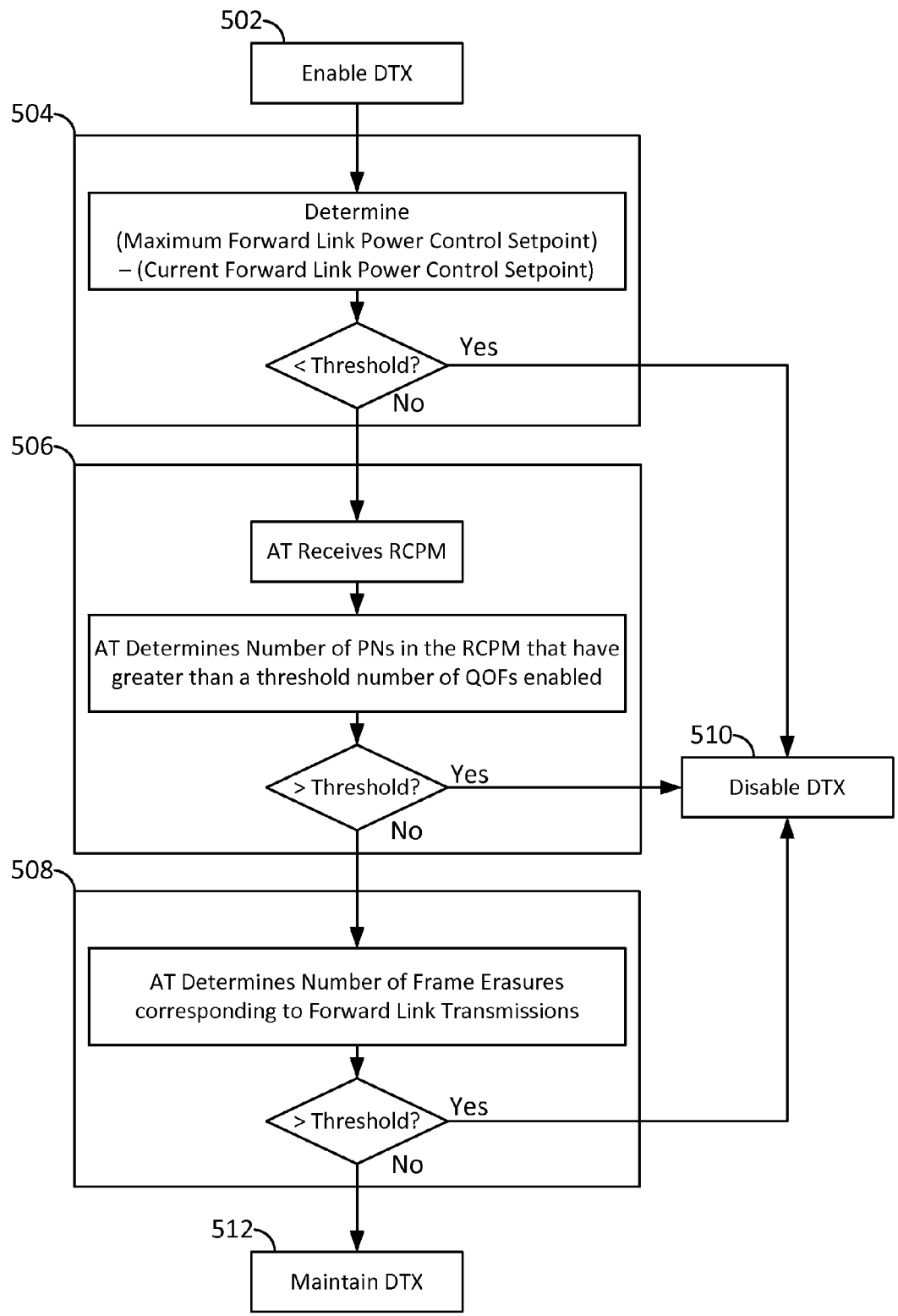
FIG. 5 is a flow chart illustrating the disabling of DTX operations in accordance with network parameters according to some embodiments.

That is, FIG. 5 is a flow chart illustrating an exemplary process 500 operable at an access terminal 104 for determining whether to disable a DTX operation in accordance with an aspect of the present disclosure. In the illustrated process, three particular parameters are checked by the access terminal 104 to determine whether to disable DTX, and any one or more of the illustrated parameters may be utilized to disable DTX. Of course, the illustrated process is merely exemplary in nature, and those skilled in the art will understand that in any particular implementation, an access terminal might only check a subset of the illustrated parameters, and in other examples within the scope of the present disclosure, an access terminal may be configured to utilize other suitable measurable parameters corresponding to network configuration, and/or network performance, as discussed above.

Referring to FIG. 5, at step 502, the access terminal 104 may enable DTX operations. For example, in accordance with a suitable gating pattern, which in some examples may be indicated from the network, and in other examples may be determined or predetermined at the access terminal 104, reverse link transmissions from the access terminal 104 may be managed by the DTX operations 312 as described above.

At 504, DTX may be disabled if the forward link power control setpoint is within a given distance of a predetermined maximum setpoint.

That is, when the base station 102 transmits the forward link, the transmission power of the forward link transmissions is compared with a certain power control setpoint. This power control setpoint is set at the access terminal 104 in accordance with an information element transmitted by the base station 102, configured for adjusting the setpoint. That is, when a frame error rate corresponding to the received forward link is high, the access terminal 104 can increase its power control setpoint; and when the frame error rate is low, the access terminal 104 may decrease its power control setpoint. The frame error rate may be determined at the access terminal 104 in accordance with a suitable error checking algorithm, such as a cyclic redundancy check (CRC).

According to 1× standards, the forward link transmission power at the base station 102 is limited in accordance with a maximum forward link power control setpoint. If the power control setpoint is increased up to a point where it is close to its maximum, the need for capacity at the base station 102 may increase. Under these circumstances, because DTX for reverse link transmissions from the access terminal 104 might interfere with the Frame Early Termination functionality, as described above, in order to allow Frame Early Termination to operate as intended and to reduce transmit power at the base station, DTX functionality at the access terminal 104 may be disabled.

In this case, the access terminal 104 may be configured to determine, in accordance with a received forward link transmission, whether the difference between the maximum forward link power control setpoint, and the current forward link power control setpoint, is within a certain (e.g., predetermined) threshold amount. If yes, then the access terminal 104 may proceed to step 510, to disable DTX operations.

At 506, DTX may be disabled if greater than a predetermined number of PNs in the Radio Configuration Parameters Message (RCPM) each have greater than a certain number of quasi-orthogonal function (QOF) sets enabled.

That is, for spreading or modulating a CDMA transmission, a set of orthogonal channelization codes called Walsh codes are generally used by access terminals for uplink (reverse link) transmissions. The base station 102 can accordingly utilize a correlation receiver configured with the same channelization code to discriminate the access terminals and decode their reverse link transmissions. Thus, an access terminal-specific channelization code is generally assigned to each access terminal in a cell.

However, when interference is relatively low, such that the channel can sustain more transmissions, it may be the case that large numbers of access terminals are active in the same cell. In this case, the capacity of the cell is limited by the number of Walsh codes available to be assigned to access terminals.

Thus, to expand the capacity of a cell suffering from Walsh code exhaustion, a more recent addition to CDMA technology has introduced quasi-orthogonal functions (QOFs). Here, QOFs are generated by multiplying Walsh codes with a certain masking function, and can result in an expansion in the set of access terminal-specific channelization codes available for assignment to access terminals in the cell. In some examples, each pseudorandom number (PN) (e.g., a Walsh code) might be mixed with two or more different masking functions, to further expand the set of channelization codes.

When the use of QOFs is desired, information corresponding to each pseudorandom number (PN) (e.g., a Walsh code) identified in the RCPM may indicate that one or more QOF sets are enabled for each of the corresponding PNs. Thus, the access terminal 104 may be able to determine, in accordance with the number of PNs within the RCPM that have greater than a threshold number of QOFs enabled, that the base station is supporting a relatively large number of users. In this case, to improve capacity at the base station, it may be advantageous to discontinue DTX operations that may otherwise interfere with the proper operation of the Frame Early Termination operation.

Therefore, in accordance with an aspect of the disclosure, in the case that greater than a predetermined number of PNs in the RCPM each have greater than a certain number of QOF sets enabled, the process may proceed to step 510, wherein the access terminal 104 may disable DTX, thereby reducing the likelihood of problems with Frame Early Termination, and enabling better power reduction at the base station.

At 508, DTX may be disabled if greater than a threshold number of frame erasures occur. That is, in the case that the cell is serving very large numbers of access terminals, it may occur that, due for example to interference from other access terminals, forward link transmissions may be affected by a large number of frame erasures. In this case, the ceasing of DTX operations may improve the transmission and allow a reduction in the number of frame erasures. Thus, when the access terminal 104 detects that the number of frame erasures corresponding to received forward link transmissions are greater than a given threshold, the process may proceed to step 510, wherein the access terminal 104 may disable DTX.

In a further aspect of the disclosure, rather than disabling DTX and engaging in a continuous transmission, the access terminal 104 may be enabled to modify the DTX gating pattern in such a way as not to substantially interfere with the operation of the Frame Early Termination operation. That is, there may be some probability that the ACKMask corresponding to Frame Early Termination (introduced above) may partially or fully overlap with the DTX timing (i.e., some or all the PCGs in which an ACK transmission from the access terminal 104 is allowed fall into the OFF PCGs according to DTX).

That is, in an access terminal 104 configured for both Frame Early Termination and DTX for gating of traffic and/or pilot frames enabled as described herein, there may be an issue if the Frame Early Termination ACK message is scheduled to be transmitted during an off-PCG according to the selected gating pattern. Therefore, the DTX operations 312 may be enabled to compensate the pattern to accommodate the transmission of the ACK messages for Frame Early Termination.

Figure 6:
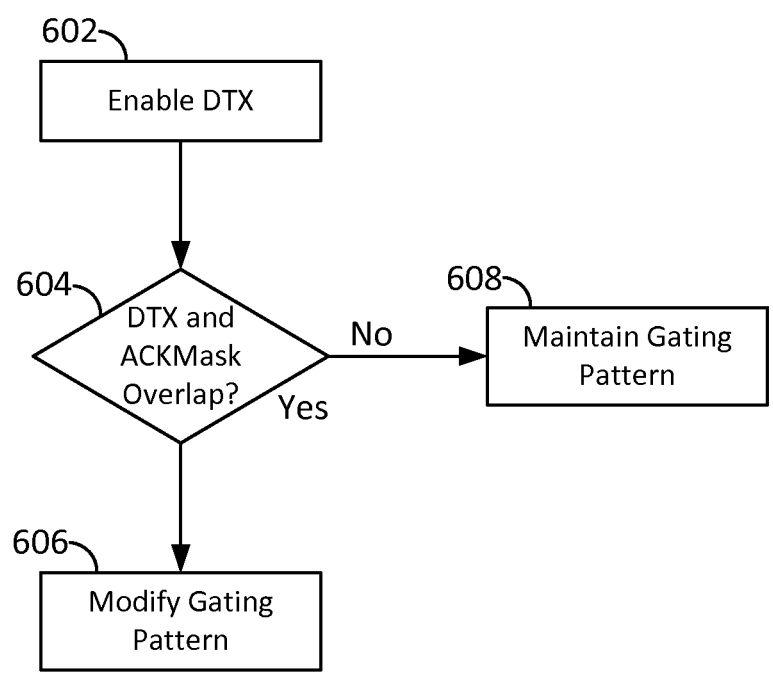
FIG. 6 is a flow chart illustrating a process for modifying a gating pattern in accordance with some embodiments.

FIG. 6 is a flow chart illustrating an exemplary process 600 operable at an access terminal for modifying a DTX gating pattern to accommodate Frame Early Termination ACK transmissions in accordance with an aspect of the disclosure. In the illustrated example, at step 602, the access terminal 104 may enable DTX operations utilizing a suitable gating pattern. At step 604, the access terminal 104 may determine whether the gating pattern utilized for the DTX operations partly or wholly overlaps with an ACKMask configured for Frame Early Termination operations. For example, if the ACKMask is configured such that the access terminal 104 is configured to transmit an ACK message for Frame Early Termination during at least one PCG wherein the reverse link transmissions from the access terminal 104 are scheduled to be gated off according to the DTX operations, then the gating pattern for DTX operations partly or wholly overlaps with the ACKMask. In some example, the step 604 may only consider whether the gating pattern for DTX operations wholly overlaps with the ACKMask, i.e., wherein the access terminal 104 is only scheduled to transmit ACK messages corresponding to the Frame Early Termination operations during PCGs scheduled to be gated off in accordance with the DTX operations.

If the overlap is detected, then at step 606, in accordance with an aspect of the disclosure, the access terminal 104 may change the DTX operations in a manner such that at least one ACK transmission corresponding to Frame Early Termination operations may be scheduled during an on-PCG corresponding to the DTX gating pattern.

For example, in one aspect of the disclosure, the gating pattern for DTX operations may be modified to enable at least one more on-PCG. For example, referring once again to FIG. 4, if the gating pattern is initially configured to gate off PCGs 0, 1, 4, 5, 8, 9, 12, and 13 (in a typical 16-PCG frame), at step 606, the access terminal may set at least one of these PCGs to be an on-PCG. For example, the resulting gating pattern for DTX operations may be such that PCGs 0, 1, 4, 5, 8, and 9 are off-PCGs, while all other PCGs are on-PCGs.

While the above discussed aspects, arrangements, and embodiments are discussed with specific details and particularity, one or more of the components, steps, features and/or functions illustrated in FIGS. 1, 2, 3, 4, 5, and/or 6 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, and/or 3 may be configured to perform or employ one or more of the methods, features, parameters, and/or steps described in FIGS. 5 and/or 6. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A method of wireless communication operable at an access terminal configured for operation in a wireless communication network, comprising:
   transmitting on a reverse link traffic channel utilizing a predetermined gating pattern; and
   determining, based on a performance metric of the wireless communication network, to cease utilizing the predetermined gating pattern, the performance metric comprising a number of quasi-orthogonal function sets being utilized by a base station that is received at the access terminal in a radio configuration parameters message,
   wherein the determining to cease the utilizing of the predetermined gating pattern comprises determining that greater than a predetermined number of pseudorandom numbers (PNs) in a radio configuration parameters message received at the access terminal have greater than a threshold number of quasi-orthogonal function sets enabled.

2. The method of claim 1, wherein the performance metric of the wireless communication network further comprises a number of frame erasures corresponding to a forward link transmission, and
   wherein the determining to cease the utilizing of the predetermined gating pattern comprises determining that greater than a threshold number of frame erasures occur within a predetermined window.

3. An access terminal configured for operation in a wireless communication network, comprising:
   means for transmitting on a reverse link traffic channel utilizing a predetermined gating pattern; and
   means for determining, based on a performance metric of the wireless communication network, to cease the utilizing of the predetermined gating pattern, the performance metric comprising a number of quasi-orthogonal function sets being utilized by a base station that is received at the access terminal in a radio configuration parameters message,
   wherein the means for determining to cease the utilizing of the predetermined gating pattern comprises means for determining that greater than a predetermined number of pseudorandom numbers (PNs) in a radio configuration parameters message received at the access terminal have greater than a threshold number of quasi-orthogonal function sets enabled.

4. The access terminal of claim 3, wherein the performance metric of the wireless communication network further comprises a number of frame erasures corresponding to a forward link transmission, and
   wherein the means for determining to cease the utilizing of the predetermined gating pattern comprises means for determining that greater than a threshold number of frame erasures occur within a predetermined window.

5. An access terminal configured for operation in a wireless communication network, comprising:
   at least one processor;

a memory communicatively coupled to the at least one processor; and a communications interface communicatively coupled to the at least one processor, wherein the at least one processor is configured to:

transmit on a reverse link traffic channel utilizing a predetermined gating pattern; and determine, based on a performance metric of the wireless communication network, to cease the utilizing of the predetermined gating pattern, the performance metric comprising a number of quasi-orthogonal function sets being utilized by a base station that is received at the access terminal in a radio configuration parameters message, wherein the at least one processor, being configured to determine to cease the utilizing of the predetermined gating pattern, is further configured to determine that greater than a predetermined number of pseudorandom numbers (PNs) in the radio configuration parameters message received at the access terminal have greater than a threshold number of quasi-orthogonal function sets enabled.

6. The access terminal of claim 5, wherein the performance metric of the wireless communication network further comprises a number of frame erasures corresponding to a forward link transmission, and wherein the at least one processor, being configured to determine to cease the utilizing of the predetermined gating pattern, is further configured to determine that greater than a threshold number of frame erasures occur within a predetermined window.

7. A non-transitory computer-readable storage medium operable in an access terminal configured for operation in a wireless communication network, comprising:

instructions for causing a computer to transmit on a reverse link traffic channel utilizing a predetermined gating pattern; and instructions for causing a computer to determine, based on a performance metric of the wireless communication network, to cease the utilizing of the predetermined gating pattern, the performance metric comprising a number of quasi-orthogonal function sets being utilized by a base station that is received at the access terminal in a radio configuration parameters message, wherein the instructions for causing a computer to determine to cease the utilizing of the predetermined gating pattern comprise instructions for causing a computer to determine that greater than a predetermined number of pseudorandom numbers (PNs) in the radio configuration parameters message received at the access terminal have greater than a threshold number of quasi-orthogonal function sets enabled.

8. The non-transitory computer-readable storage medium of claim 7, wherein the performance metric of the wireless communication network further comprises a number of frame erasures corresponding to a forward link transmission, and wherein the instructions for causing a computer to determine to cease the utilizing of the predetermined gating pattern comprise instructions for causing a computer to determine that greater than a threshold number of frame erasures occur within a predetermined window.

* * * * *